United States Patent
Sylvester et al.

(10) Patent No.: US 7,074,846 B2
(45) Date of Patent: Jul. 11, 2006

(54) RUBBER MODIFIED ASPHALT CEMENT COMPOSITIONS AND METHODS

(75) Inventors: Laurence M. Sylvester, Tiburon, CA (US); Jimmy Lee Stevens, Riverside, CA (US)

(73) Assignee: RAM Technologies, Inc., Reno, NV (US)

( * ) Notice: Subject to any disclaimer, the term of this patent is extended or adjusted under 35 U.S.C. 154(b) by 51 days.

(21) Appl. No.: 10/735,276

(22) Filed: Dec. 12, 2003

(65) Prior Publication Data

US 2004/0225036 A1    Nov. 11, 2004

Related U.S. Application Data

(63) Continuation-in-part of application No. 10/652,725, filed on Aug. 29, 2003.

(60) Provisional application No. 60/432,972, filed on Dec. 12, 2002, provisional application No. 60/406,760, filed on Aug. 29, 2002.

(51) Int. Cl.
  *C08L 95/00* (2006.01)
(52) U.S. Cl. .......................... 524/71; 524/68
(58) Field of Classification Search ................. 524/68, 524/71
  See application file for complete search history.

(56) References Cited

U.S. PATENT DOCUMENTS

| 3,891,585 A | 6/1975 | McDonald |
| 3,919,148 A | 11/1975 | Winters et al. |
| 4,018,730 A | 4/1977 | McDonald |
| 4,069,182 A | 1/1978 | McDonald |
| 4,085,078 A | 4/1978 | McDonald |
| 4,430,464 A | 2/1984 | Oliver |
| 4,485,201 A | 11/1984 | Davis |
| 4,588,634 A | 5/1986 | Pagen et al. |
| 4,609,696 A | 9/1986 | Wilkes |
| 3,891,585 A | 11/1989 | McDonald |
| 5,270,361 A | 12/1993 | Doung et al. |
| 5,334,641 A | 8/1994 | Rouse |
| 5,492,561 A | 2/1996 | Flanigan |
| 5,539,029 A | 7/1996 | Burris |
| 5,618,862 A | 4/1997 | Germanaud et al. |
| 5,756,565 A | 5/1998 | Germanaud et al. |
| 5,811,477 A | 9/1998 | Burris et al. |
| 5,880,185 A | 3/1999 | Planche et al. |
| 6,117,926 A | 9/2000 | Engber et al. |
| 6,156,828 A | 12/2000 | Wickett |
| 6,399,680 B1 | 6/2002 | Engber et al. |

*Primary Examiner*—Peter Szekely
(74) *Attorney, Agent, or Firm*—Robert D Buyan; Stout, Uxa, Buyan & Mullins, LLP

(57) ABSTRACT

The present invention discloses methods of making improved rubber modified asphalt cement compositions, and compositions made by the method, where the compositions are useful in paving, roofing, coating and other sealing applications. In one aspect, the method comprises combining asphalt, RVPR (or a blended mixture of asphalt and RVPR) and at least one dodecyl or tridecylbenzene sulfonic acid (SA), which can be linear (LAS) or branched (BAS), in the presence of moderate heat. After heating the resultant RMAC mixture exhibits at least one of the following: (1) an increase in softening point, (2) an increase in hardness, or (3) improved recovery from deformation. In another aspect, the invention teaches addition of at least one SA to previously manufactured RMAC to accomplish at least one of the following: (1) an increase in softening point, (2) an increase in hardness, or (3) improved recovery from deformation. For paving compositions, the resultant RMAC mixtures made by the methods of the invention are mixed with an appropriate grade of aggregate composition, and other paving materials as desired.

23 Claims, 1 Drawing Sheet

US 7,074,846 B2

RUBBER MODIFIED ASPHALT CEMENT COMPOSITIONS AND METHODS

RELATED APPLICATIONS

This patent application claims priority to U.S. Provisional Patent Application Ser. No. 60/432,972 filed on Dec. 12, 2002, which is expressly incorporated herein by reference. Also, this application is a continuation in part of copending U.S. patent application Ser. No. 10/652,725 filed on Aug. 29, 2003 which claims priority to U.S. Provisional Patent Application No. 60/406,760 filed on Aug. 29, 2002, the entireties of which are expressly incorporated herein by reference.

FIELD OF THE INVENTION

The present invention generally relates to methods of making improved rubber modified asphalt cement compositions, and compositions made by the method, where the compositions are useful in paving, roofing, coating and other sealing applications.

BACKGROUND OF THE INVENTION

Ever since the first United States patent was issued in 1930 to Samuel Sadtler (U.S. Pat. No. 1,758,913) for a rubber and asphalt mixture for use as a road surface product, the asphalt industry has continued to devise new methods for the production of rubber modified asphalt cement (RMAC).

To date, some of the processes for producing RMAC include the addition of solubilized rubber crumb (U.S. Pat. No. 5,798,394, Meyers et al.) gelled crumb rubber (U.S. Pat. No. 3,891,585, McDonald), melted crumb rubber (U.S. Pat No. 5,492,561, Flanigan I) (U.S. Pat. No. 5,334,641, Rouse), mechanically sheared (U.S. Pat. No. 6,66,676, Rouse et al.), and/or acid treated asphalt (U.S. Pat. No. 5,095,055, Moran) for incorporating vulcanized rubber into asphalt. Memon (U.S. Pat. No. 6,444,731) teaches addition of a dispersion agent, such as furfural and/or vegetable oil) to the crumb rubber material, which is then heated at elevated temperatures that can be as high as 1500° C., to ensure the rubber is fully treated with the dispersion agent. The treated rubber is then added to hot asphalt, after which an activator (a Lewis acid that contains a trace of sulfur) and a micro-activator (phenyl formaldehyde resin) are added and mixed, to achieve a modified asphalt.

Although prior art processes have made some inroads in improved production of RMAC, the hurdle remains to find a way to devulcanize recycled vulcanized particulate rubber (RVPR) and incorporate it into the asphalt in a single step process. Such a process should not degrade the asphalt or the rubber through the use of high temperatures, require highly sophisticated equipment or release harmful toxins into the air.

SUMMARY OF THE INVENTION

The present invention provides a method for devulcanizing recycled vulcanized particulate rubber (RVPR) and incorporating it into the asphalt in a process, such as a single step process. The method does not degrade the asphalt or the rubber through the use of high temperatures, does not require highly sophisticated equipment and does not release harmful toxins into the air. The invention also discloses improved RMAC products made by the method of the invention.

In one aspect, a method of the invention comprises the step of combining asphalt, rubber and at least one dodecyl or tridecylbenzene sulfonic acid (AS), which can be linear (LAS) or branched (BAS), in the presence of moderate heat and/or mixing to form rubber modified asphalt. The components may be combined in various orders. In some applications, the asphalt may be initially combined with the dodecyl or tridecylbenzene sulfonic acid (e.g., DDBSA) and the rubber may then be added with heat and/or mixing. Although any suitable temperature may be used, the temperatures used are preferably in the range of about 225° to about 450° F. (ca. 107° C. to about 232° C.), most preferably at about 350° F. (ca.177° C.). Although any type of rubber may be used, one type of rubber that may be preferable is crumb rubber obtained form recycled vehicle tires. Rubber particles of any suitable size may be used. In some applications, crumb rubber particles sized to pass through a U.S. series sieve as large as a #9 mesh may be employed.

Further in accordance with the invention, there is provided a method for making rubber modified asphalt wherein asphalt is combined with rubber or RVPR (or a blended mixture of asphalt and RVPR) and at least one dodecyl or tridecylbenzene sulfonic acid (AS), which can be linear (LAS) or branched (BAS), in the presence of moderate heat. Preferably, the mixture of asphalt, rubber or RVPR and the SA(s) are heated at temperatures of about 225° to about 450° F. (ca. 107° C. to about 232° C.), most preferably at about 350° F. (ca.177° C.). The mixture is heated, preferably for about 1–2 hours, or until the resultant RMAC mixture exhibits at least one of the following: (1) an increase in softening point, (2) an increase in hardness, or (3) improved recovery from deformation. For paving compositions, the resultant RMAC mixture is mixed with an appropriate grade of aggregate composition, and other paving materials as desired. The resultant RMAC may also be emulsified in an aqueous solution to form a seal coat.

According to the another teaching of the present invention, sulfonic acids of dodecylbenzene and tridecylbenzene may also be added to previously manufactured RMAC to accomplish at least one of the following in the resultant improved RMAC: (1) an increase in the softening point, (2) an increase in the hardness, or (3) an improvement in the recovery from deformation, of the resulting improved RMAC compositions. This aspect of the invention includes a method for improving at least one of (1) the softening point, (2) the hardness, or (3) the recovery from deformation of a RMAC composition comprising adding at least one dodecyl or tridecylbenzene sulfonic acid (SA), in the amount of from about 1 to about 10 percent, W/W, to the RMAC in the presence of moderate heat (about 225° to about 450° F. (ca. 107° C. to about 232° C.)) for about 1–4 hours, and improved RMAC compositions made by this method.

In preferred form, for use in the present invention, the sulfonic acid is a linear dodecylbenzene sulfonic acid with from about 1 to about 18 alkyl groups. Especially preferred is dodecylbenzene sulfonic acid (or DDBSA, which is also known as DBSA).

DETAILED DESCRIPTION AND EXAMPLES

Figure 1:
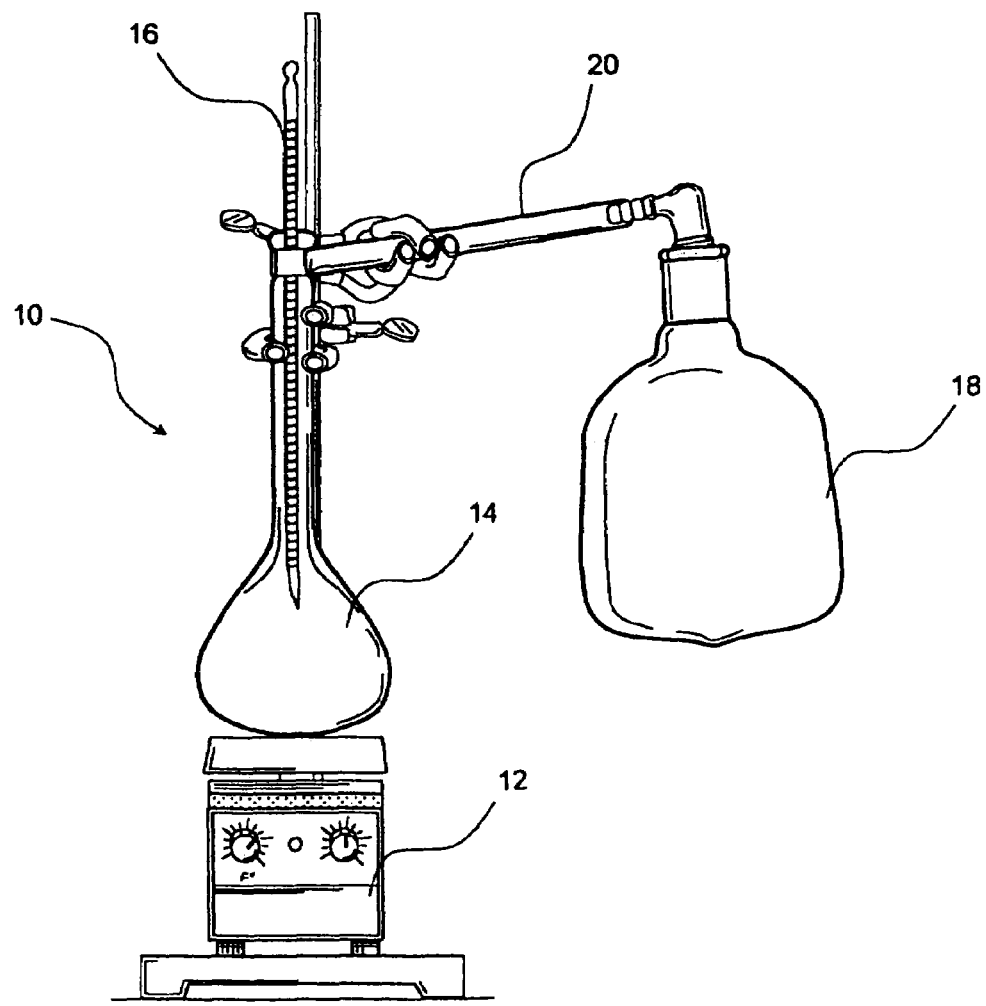
FIG. 1 is a diagram of the experimental apparatus used in Example 4 below.

The following detailed description with examples, and the accompanying drawings and tables to which it refers, are provided for the purpose of describing and illustrating certain examples or specific embodiments of the invention only and not for the purpose of exhaustively describing all possible embodiments and examples of the invention. Thus, this detailed description with examples does not in any way limit the scope of the inventions claimed in this patent application or in any patent(s) issuing form this or any related application.

EXAMPLE 1

Method

A. 400 grams of asphalt (AR4000, San Joaquin Refining, Bakersfield, Calif.), with a softening point of 118° F. (ca. 48° C.) and a penetration of 33 at 77° F. (25° C.) was heated for about 60 minutes at about 350° F. (ca. 177° C.) until it was free flowing and then mixed with 59.77 grams of 80 mesh crumb rubber (BAS Recycling, Inc., San Bernardino, Calif.).

B. A portion of the mixture was then drawn off and tested.

C. 18.39 grams of DDBSA (Pilot Chemical, Inc., Santa Fe Springs, Calif.) was then added all at once to the non-drawn off and remaining portion of the rubber/asphalt mixture, which was then continuously blended with a simple propellor mixer for a period of about 2 hours at a temperature of about 350° F. (ca.177° C.).

Result

The addition of the DDBSA increased the softening point and hardness of the compositions. The test results are set forth in the following table.

|   | Composition | Penetration | Softening Point |
|---|---|---|---|
| A | Asphalt Alone | 33 | 118° F. (ca. 48° C.) |
| B | Asphalt/Rubber | 29 | 141° F. (ca. 61° C.) |
| C | Asphalt/Rubber/DDBSA | 22 | 153° F. (ca. 67° C.) |

EXAMPLE 2

Method 604.7 grams of asphalt (AR4000, Paramount Petroleum Company, Paramount, Calif.), with a softening point of 117° F. (ca. 47° C.) and a penetration of 47 at 77° F. (25° C.) was heated at about 350° F. (ca.177° C.) for about 60 minutes until it was free flowing and then mixed with 66 0.52 grams of 20 mesh crumb rubber (BAS Recycling, Inc., San Bernardino, Calif.) together with 24.188 grams of DDBSA (Pilot Chemical, Inc. Santa Fe Springs, Calif.). The rubber/asphalt/DDBSA mixture was heated to a temperature of about 350° F. (ca. 177° C.) and mixed with a simple propellor mixer. Samples were drawn and tested at elapsed times of 0.5 hours, 1 hour,2 hours and 3 hours. The changes occurring in the mixture as exhibited by the corresponding test are included in the table below.

| Heat Time and Sample | Penetration | Softening Point |
|---|---|---|
| No heat, Original Mixture (OM) | 47 | 117° F. (ca. 47° C.) |
| 0.5 hour heat + OM + DDBSA | 27 | 152° F. (ca. 67° C.) |
| 1.0 hour heat + OM + DDBSA | 26 | 150° F. (ca. 66° C.) |
| 2.0 hour heat + OM + DDBSA | 26 | 150° F. (ca. 66° C.) |
| 3.0 hour heat + OM + DDBSA | 26 | 147° F. (ca. 64° C.) |

EXAMPLE 3

Method.

A blended and homogenous mixture of RMAC containing approximately 13.25% crumb rubber from recycled tires (MAC10-TR) was reacted with increasing percentages (by weight) of DDBSA. The mixtures were mixed with a simple propeller mixer and heated at a temperature of about 350° F. (ca.177° C.) for about 60 minutes.

Results

These tests demonstrate that the greater the amount of DDBSA, the higher the softening point and the greater the penetration. Results are summarized in the table below.

| Sample | % DDBSA | Penetration @ 77° F. (25° C.) | Softening Point |
|---|---|---|---|
| MAC 10-TR, W/O DDBSA | 0 | 46 | 124° F. (ca. 51° C.) |
| MAC 10-TR, W/2% DDBSA | 2 | 33 | 150° F. (ca. 66° C.) |
| MAC 10-TR, W/4% DDBSA | 4 | 20 | 152° F. (ca. 67° C.) |
| MAC 10-TR, W/6% DDBSA | 6 | 23 | 163° F. (ca. 73° C.) |

EXAMPLE 4 DDBSA (which is also known as DBSA) Reactions with Asphalt and Crumb Rubber.

Summary:

Several experiments were carried out to determine the nature of gases evolved (if any) when asphalt was heated to about 300° F. (ca. 149° C.) by itself, when DBSA was heated to the same temperature by itself, then with asphalt, with crumb rubber, and finally with both asphalt and rubber crumb. Gasses evolved were trapped in tedlar bags attached to the closed system being heated. FIG. 1 is a diagram of the experimental set up 10 which comprised a hot plate/magnetic stirrer base 12, a sealed flask 14, a thermometer 16, a sealed bag 18 (i.e., a Tedlar bag) and a tube 20 connecting the interior of the flask 14 to the interior of the bag 18. Asphalt and DDBSA were combined in the flask and heated to about 300° F. (ca. 149° C.). Foaming occurred in flask 14 and elemental sulfur was deposited on the cooled glassware, but no gasses were observed to collect in the bag 18. When a mixture of crumb rubber and DDBSA were placed in the flask 14 and heated to around 300° F. (ca. 149° C.), elemental sulphur and gases containing hydrocarbons and sulfur compounds were evolved and collected in the bag 18. When crumb rubber, asphalt and DDBSA were combined in the flask and heated to a temperature of about 300° F. (ca.149° C.), foaming occurred in the flask and evidence of formation of elemental sulphur and evolved gases were observed to collect in the bag 18. These major hydrocarbon gases and sulphur containing gasses were identified by gas chromatography/and mass spectrometry (GC/MS). This involves separating the gases from each other (GC), then identifying the gas after it had been bombarded with electrons (MS) with the help of a computerized catalogue containing spectra of about 80,000 compounds.

These preliminary experiments revealed that the role of DBSA in the reaction involving crumb rubber and asphalt appears to be de-vulcanization of the rubber crumb. DBSA also has the capability to catalyze reactions of the de-vulcanized rubber with molecules present in asphalt (particularly any molecules with double bonds.) This catalytic role can apparently continue even after the rubber asphalt has been emulsified (i.e., carbon to carbon bond formation can continue even in the presence of water). As a strong surfactant, DBSA would stabilize the asphaltenes (and hence the entire system) in an asphalt-rubber system. The presence a flask to 149° C (300° F), and the system rapidly closed again to allow the bubbling gases to enter the tedlar bag. The asphalt-DBSA mixture continued to be stirred for 43 minutes (as long as some foam bubbles were still being formed on the surface of the asphalt) at temperatures that ranged between 147 and 155° C (297–311° F). In spite of all the bubbling and foaming that was taking place in the flask, there was no evidence of gas being collected—the tedlar bags remained uninflated. This was true whether 8.5 grams or 26.1 grams of DBSA had been added to the flask containing 500 grams asphalt. However, there was evidence of some milky liquid condensing on the walls of the flask.

Peak area is generally proportional to concentration. Approximate concentrations were calculated assuming that the peak areas were directly proportional to mass.

TABLE 1

Identity and Normalized Approximate % Concentration* f the 10–12 Largest Peaks in the Sample as Detected by a Capillary Gas Chromatograph-Mass Selective Detector

| | Reactants | | | |
|---|---|---|---|---|
| Compound | Rubber Crumb + DBSA (t = 0–12 minutes at 140°–199° C. or 284–390° F.) | Rubber Crumb + DBSA (t = 12–195 min. at 149°–210° C. or 300–410° F.) | PG58-28 Asphalt + Rubber Crumb + DBSA, Run 1 (t = 130 minutes at 144–168° C. or 291–334° F) | PG58-28 Asphalt + Rubber Crumb + DBSA, Run 2 (t = 126 minutes at 141–158° C. or 286–316° F) |
| 2-methyl propane | 9.33 | 32.81 | 0.92 | 0.30 |
| 2-methyl-1-propene | 6.28 | 18.41 | 0.44 | 0.46 |
| 2-methyl butane | 1.97 | 2.51 | 3.19 | 0.24 |
| butane | — | — | 4.76 | 0.34 |
| 2-methyl-1-butene | 0.94 | 3.56 | 0.45 | — |
| pentane | — | — | 0.98 | — |
| 2-pentene | — | — | 0.41 | — |
| 2-methyl pentane | — | 1.78 | 0.87 | 0.26 |
| 2-methyl-2-pentene | 0.65 | 2.06 | — | — |
| 2,4,4-trimrthyl-1-pentene | 0.75 | 1.91 | — | — |
| 2,3,4-trimrthyl-2-pentene | 1.36 | 2.59 | — | — |
| 2,2-dimethyl hexane | — | — | — | 0.22 |
| 3,4-dimethyl hexane | — | — | 0.51 | — |
| 2,5-dimethyl-2-hexane | 0.83 | 2.13 | — | — |
| 2-methyl-2-propanethiol | 0.57 | | | |
| Carbon disulfide | — | — | — | 0.21 |
| Hydrogen sulfide | — | 4.74 | 1.67 | 2.88 |
| Sulfur dioxide | 5.31 | — | — | — |
| Air (oxygen, nitrogen, carbon dioxide + argon) | 72.02 | 27.49 | 85.80 | 95.07 |

*Peak area is generally proportional to concentration. Approximate concentrations were calculated assuming that the peak areas were directly proportional to mass of DDBSA when the asphalt-rubber mixture is emulsified may provide additional emulsion stability. There was no evidence of gas evolution when duplicate samples of DBSA (50 grams of material provided by Ram Technologies) were heated for 45 minutes at temperatures ranging between 138° C (280° F) and 175° C (347° F). In other words, the tedlar bag d not become inflated during that time.

Similarly, there was no evidence of gases being evolved and trapped by the attached tedlar bag when asphalt (50 grams PG58-28 from McAsphalt Industries in Winnipeg) was heated alone at 149–152° C (300–306° F) for 15 minutes.

Experimental:
Asphalt Heated with DBSA
DBSA was added to asphalt (500 grams of PG58-28 from McAsphalt Industries in Winnipeg) that had been heated in From the results in Table 1, it appears that air (displaced from the rubber crumb surface) made up most of the gas filling the bag 18 in the first 12 minutes of the reaction. After that, pyrolysis gases like 2 methyl propane and 2-methyl propene from the decomposition of rubber crumb in the presence DBSA began to dominate the gases evolved. In the presence of asphalt, however, it appears that while some of these molecules are still evolved from the rubber crumb, many appear to have been either absorbed into the asphalt or reacted with molecules in the asphalt. It must be noted, however, that temperatures of mixtures in asphalt were much easier to control than temperatures of the DBSA-rubber crumb mixture, which rose uncontrollably high, leading to significant pyrolysis of the rubber crumb.

Since no gases had been evolved when DBSA was heated with asphalt alone, the gases collected when DBSA was heated with asphalt and rubber crumb would likely have come from the rubber crumb.

In the flask 12 containing 500 g asphalt and 26.1 g DBSA, an attempt was made to encourage evolving gaseous (or liquid) materials to enter the tedlar bags instead of condensing on the flask walls. The top and neck of the flask were wrapped to insulate the area in the flask above the hot asphalt and heating was continued for a further two hours. This resulted in the deposition of a thin cream coloured solid layer in the glass side arm of the adapter and in the glass tubing acting as an adapter to connect the side arm to the flexible tubing connected to the tedlar bag. This cream-coloured solid sublimed off the glass surfaces within a day at room temperature. This is strong evidence that sulfur present in asphalt had been released when asphalt was heated in the presence of the DBSA. However, there was no evidence of bag 18 inflation even after of two hours and 42 minutes of heating asphalt with DBSA at temperatures that ranged between 141 and 155° C (286–311° F).

Rubber Crumb Heated with DBSA

When rubber crumb (80 mesh, 66 grams) was combined with DBSA (31.1 grams), not all the rubber crumb was wetted by DBSA, resulting in uneven heat transfer within the mass inside the flask 12. Temperature control was difficult. As heating progressed, some small areas of wetness and bubbling appeared in a few areas of the rubber mass. As each bubble broke, a puff of smoke issued forth. Within an eight minute period, the measured temperature in one area of the rubber mass rose from 140° C (284° F) to 199° C (390° F). The first bag 18 rapidly filled w was replaced with a second bag 18 after twelve minutes. The measured temperatures ranged between 149° C (300° F) and 210° C (410° F) over the next three hours and 3 minutes as gases were collected in the second bag 18.

The top part of the flask 12 had been insulated to allow evolving gases to pass into the second bag 18. When the heating was ended and insulation removed, a creamy colored condensate was observed moving down the neck of the flask 12. A sulfurous smell came forth when the adapter was removed from the flask 12 to expose the flask contents to the air.

Heating Asphalt with Rubber Crumb and DBSA Rubber crumb (80 mesh, 66 grams) was mixed with DBSA (29.3 and 32.7 grams respectively added to Flasks 1 and 2) and then added to flasks of pre-heated asphalt (430 grams of PG58-28, preheated to 120° C [248° F], in each of Flasks 1 and 2). The system was rapidly closed and connected to tedlar bags that were opened immediately to collect any evolving gases produced. Occasional gentle manual flask shaking was needed to supplement the magnetic stirring to incorporate the rubber crumb into the asphalt. Foaming and bubbling increased as the mixture was heated and stirred. Heating in Flask 1 continued for 130 minutes, maintaining temperatures between 144.5 and 168° C (292–334° F). Heating in Flask 2 continued for 126 minutes, with temperatures ranging between 141 and 158° C. Both tedlar bags showed evidence of some gas having been collected. A cream coloured condensate was observed on the upper (cooler) parts of the flask.

Analyses of Volatile Reaction Products:

The four bags 18 that showed evidence of having collected gases were analyzed for volatile organic compounds and for sulfur compounds by GC/MS as mentioned earlier. The results of these analyses are shown in Tables 1 and 2.

TABLE 2

Sulfer Compound Gas Analysis
Identity and Normalized % Concentration of Sulfur Compounds in Gasses Evolved

| | Reactants | | | |
|---|---|---|---|---|
| Compound | Rubber Crumb + DBSA (t = 0–12 minutes at 140°–199° C. or 284–390° F.) | Rubber Crumb + DBSA (t = 12–195 min. at 149°–210° C. or 300–410° F.) | PG58-28 Asphalt + Rubber Crumb + DBSA, Run 1 (t = 130 minutes at 144–168° C. or 291–334° P) | PG58-28 Asphalt + Rubber Crumb + DBSA, Run 2 (t = 126 minutes at 141–158° C. or 286–316° P) |
| Carbon disulfide | 13.6 | 6.21 | 1.79 | 1.14 |
| Hydrogen sulfide | 55.2 | 82.3 | 96.96 | 97.80 |
| Sulfur dioxide | —* | — | — | — |
| Methyl mercaptan | 0.30 | 0.27 | 0.15 | 0.22 |
| Ethyl mercaptan | 1.43 | 0.08 | 0.15 | 0.06 |
| n-propyl mercaptan | — | 0.02 | — | — |
| i-propyl mercaptan | 0.39 | 0.19 | — | 0.04 |
| n-butyl mercaptan | 1.67 | 1.26 | — | 0.03 |
| Sec-butyl mercaptan | 0.23 | 0.06 | — | 0.03 |
| t-butyl mercaptan | 26.85 | 9.22 | 0.95 | 0.64 |
| Dimethyl sulfide | 0.14 | 0.26 | — | 0.03 |
| Methylethyl sulfide | — | 0.08 | — | — |
| Diethyl sulfide | 0.25 | 0.07 | — | 0.01 |

*Inconsistent with the findings of major peaks for this sample as shown in Table I From Table 2, it is apparent that the reaction of rubber crumb with either rubber crumb or with asphalt in the presence of DBSA produces a number of sulfur-containing compounds, with hydrogen sulfide being by far the most dominant species. Since only solid sulfur but no gases had been evolved during the heating of asphalt alone with DBSA, it appears that the sulfur-containing gases evolved during the heating of asphalt, rubber crumb and DBSA would have originated from the rubber crumb.

Crumb rubber consists of vulcanized polymers obtained from the treads of tires. Tire rubber vulcanization involves using sulfur to cross-link the polymers, which are mainly a blend of butadiene and styrenebutadiene-styrene polymers. The presence of hydrogen sulfide and other sulfur-containing compounds in the gases evolved when rubber crumb was heated in asphalt in the presence of DBSA is a strong indicator that rubber crumb is being de-vulcanized—the sulfur cross-links are being eliminated—during the process.

Conclusion

The role of DBSA in the reaction involving rubber crumb and asphalt appears to be de-vulcanization of the rubber crumb. DBSA also has the capability to catalyze reactions of the de-vulcanized rubber with molecules present in asphalt (particularly any molecules with double bonds). This catalytic role can apparently continue even after the rubber asphalt has been emulsified (i.e. carbon to carbon bond formation can continue even in the presence of water). As a strong surfactant, DBSA would be effective in stabilizing the asphaltenes (and hence the asphalt) within the rubber-asphalt mixture. Furthermore, in an emulsion, DBSA can then play the role of an additional emulsifier, which may be important in maintaining emulsion stability.

EXAMPLE 5

Tables 3 and 4 below list various aggregates Aggregate Compositions That May Be Mixed With the Improved Rubber Modified Asphalt Cement Compositions of the Present Invention.

TABLE 3

Dens Graded Aggregate

| Sieve Sizes | Limits of Proposed Gradation | Operating Range |
|---|---|---|
| 19-mm Maximum, Coarse | | |
| 25-mm | — | 100 |
| 19-mm | — | 90–100 |
| 9.5-mm | — | 60–75 |
| 4.75-mm | 45–50 | X +/− 5 |
| 2.36-mm | 32–36 | X +/− 5 |
| 600-um | 15–18 | X +/− 5 |
| 75-um | — | 3–7 |
| 19-mm Maximum, Medium | | |
| 25-mm | — | 100 |
| 19-mm | — | 95–100 |
| 9.5-mm | — | 65–80 |
| 4.75-mm | 49–54 | X +/− 5 |
| 2.36-mm | 36–40 | X +/− 5 |
| 600-um | 18–21 | X +/− 5 |
| 75-um | — | 3–8 |
| 12.5-mm Maximum, Coarse | | |
| 19-mm | — | 100 |
| 12.5-mm | — | 95–100 |
| 9.5-mm | — | 75-90 |
| 4.75-mm | 55–61 | X +/− 5 |
| 2.36-mm | 36–40 | X +/− 5 |
| 600-um | 18–21 | X +/− 5 |
| 75-um | — | 3–7 |
| 12.5-mm Maximum, Medium | | |
| 19-mm | — | 100 |
| 12.5-mm | — | 95–100 |
| 9.5-mm | — | 80–95 |
| 4.75-mm | 59–66 | X +/− 5 |
| 2.36-mm | 43–49 | X +/− 5 |
| 600-um | 22–27 | X +/− 5 |
| 75-um | — | 3–8 |

TABLE 3-continued

Dens Graded Aggregate

| Sieve Sizes | Limits of Proposed Gradation | Operating Range |
|---|---|---|
| 9.5-mm Maximum | | |
| 12.5-mm | — | 100 |
| 9.5-mm | — | 95–100 |
| 4.75-mm | 73–77 | X +/− 6 |
| 2.36-mm | 58–63 | X +/− 6 |
| 600-um | 29–34 | X +/− 6 |
| 75-um | — | 3–10 |
| 4.75-mm Maximum | | |
| 9.5-mm | — | 100 |
| 4.75-mm | — | 95–100 |
| 2.36-mm | 72–77 | X +/− 6 |
| 600-um | 37–43 | X +/− 7 |
| 75-um | — | 3–12 |

TABLE 4

Open Graded Aggregate

| Sieve Sizes | Limits of Proposed Gradation | Operating Range |
|---|---|---|
| 12.5-mm Maximum | | |
| 19-mm | — | 100 |
| 12.5-mm | — | 95–100 |
| 9.5-mm | 78–89 | X +/− 4 |
| 4.75-mm | 28–37 | X +/− 4 |
| 2.36-mm | 12–18 | X +/− 4 |
| 600-um | — | 0–10 |
| 75-um | — | 0–3 |
| 9.5-mm Maximum | | |
| 12.5-mm | — | 100 |
| 9.5-mm | — | 90–100 |
| 4.75-mm | 29–36 | X +/− 4 |
| 2.36-mm | 7–18 | X +/− 4 |
| 600-um | — | 0–10 |
| 75-um | — | 0–3 |
| Types A and B Asphalt Concrete Base Percentage Passing | | |

| Sieve Sizes | Limits of Proposed Gradation | Operating Range |
|---|---|---|
| 31.5-mm | — | 100 |
| 25-mm | — | 95–100 |
| 19-mm | — | 80–100 |
| 9.5-mm | 55–60 | X +/− 5 |
| 4.75-mm | 40–45 | X +/− 5 |
| 600-um | 14–19 | X +/− 5 |
| 75-um | — | 2–7 |

DEFINITIONS

The following terms of art used in the present specification and claims are defined as follows:

As used herein, "asphalt" includes bitumen, as well as naturally occurring asphalt, synthetically manufactured asphalt as the by-product of the petroleum refining process, blown asphalts, blended asphalt, residual asphalt, aged asphalt, petroleum asphalt, straight-run asphalt, thermal asphalt, paving grade-asphalt, and the like.

As used herein, "blended asphalt rubber" means RVPR and asphalt blends that have been prepared by methods such as those disclosed in U.S. Pat. No. 5,492,561 (Flanigan I), U.S. Pat. No. 5,583,168 (Flanigan II), and U.S. Pat. No. 5,496,400 (Doyle and Stevens) which disclose so-called, "TRMAC" processes for blending RVPR and asphalt. In the TRMAC process, RVPR and asphalt are heated to temperatures in excess of 400° F. (205° C.) under carefully controlled conditions that require sophisticated equipment and environmental controls. Flanigan I requires the introduction of oxygen into the mix during admixing and heating; Flanigan II requires that the mixing and heating occur in a vacuum. The Doyle/Stevens process, used by Doyle-Ellis, uses a process in which the PVPR is pretreated with a cross linking agent consisting of tall oil, a strong base, an anhydrous organic solvent and fatty amines prior to being incorporated into hot liquid asphalt. Commercial forms of blended asphalt rubber are available as MAC 10- TR from Paramount Petroleum Company, Paramount, Calif. or Doyle-Ellis, LLC, Bakersfield, Calif.) or AC5-15 TR (also available from Paramount Petroleum Company). The teaching of the present invention includes post addition of sulfonic acids of dodecylbenzene and tridecylbenzene to previously manufactured RMAC to accomplish at least one of the following: (1) an increase the softening point, (2) an increase the hardness, or (3) an increase in recovery from deformation, in the resultant RMAC compositions.

As used herein, "RMAC" means rubber modified asphalt cement. TRMAC means tire rubber modified asphalt cement. RAC means rubberized asphalt cement. The terms RMAC, TRMAC and RAC are used interchangeably.

As used herein, "RVPR" means recycled vulcanizate (or vulcanized) particulate rubber. The term "crumb rubber" or "rubber crumb" are used interchangeably with RVPR. RVPR is classified by particle size and grade (based on the polymer type of the parent compound from which the RVPR is derived). The RVPR classifications incorporated herein are the those published in the American Society for Testing and Materials publication "Standard Classification for Rubber Compounding Materials—Recycled Vulcanizate Particulate Rubber", Designation: D 5603-96, published January, 1997. In sum, "coarse rubber powders" are products with designations of 425~m (40 mesh) or larger. Coarse powders typically range in particle size from 2000~m (10 mesh) to 425~m (40 mesh) regardless of polymer type or method of processing. "Fine rubber powders" are products with designations of 425 μm (40 mesh) or smaller. These materials typically range in particle size from 300 μm (50 mesh) to less than 75 μm (200 mesh) regardless of polymer type or method of processing. Grades of RVPR are based on polymer/compound types of the parent compounds, with Grades 1, 2 and 3 being the most common, Grades 4, 5 and 6 less common. Grade 1 designates whole tire RVPR prepared from passenger car, truck, and bus tires from which the fiber and metal have been removed. The rubber is then process to the desired particle size. Grade 2 designates RVPR made from so-called "peel rubber", while Grade 3 designates RVPR made from retread buffings only.

As used herein the words "vulcanizate" and "vulcanized" are used interchangeably. As used herein, "cured rubber" means a composition consisting of thermoplastic polymer resins having no epoxy groups.

As used herein, "DDBSA" means dodecylbenzene sulfonic acid. DBSA is used interchangeably with DDBSA.

As used herein, the term "sulfonic acids of dodecylbenzenes and tridecylbenzenes" 15 refers to members of the group of chemical compounds also known as alkylbenzene sulfonics (AS). For use in the invention, the alkylbenzene sulfonics can be linear (LAS) or branched (BAS). Preferred LAS and BAS compounds for use in the present invention will have from C-1 to about C-20 alkyl derivatives.

Dodecylbenzene has the chemical formula $C_{12}H_{25}$—$C_6H_5$. Tridecylbenzene has the chemical formula $C_{13}H_{27}$—$C_6H_5$. For use in the present invention, the sulfonic group can be placed on the benzene ring on the carbon atom either next to the dodecyl or tridecyl group (at the "ortho" position), or on the second carbon atom over from the dodecyl or tridecyl group (at the "meta" position), or on the third carbon atom over from the dodecyl or tridecyl group (at the "para" position), to give molecules with the formula $C_{12}H_{25}$—$C_6H_4$—$SO_3H$ (o-, m- or p-dodecylbenzene sulfonic acid) or $C_{13}H_{27}$—$C_6H_5$—$SO_3H$ (o-, m- or p-tridecylbenzene sulfonic acid).

Dodecyl and tridecyl groups are known as alkyl groups since they are derived from alkanes (dodecane and tridecane, respectively). For use in the present invention, the alkyl groups can be as short as the methyl group $CH_3$— with only one carbon atom (derived from methane) or as long as the octadecly group with 18 carbon atoms (common in fats) or longer (as found in some heavy crudes). Also for use in the present invention, the alkyl groups can be in the form of straight chains, or may contain any number of side branches of smaller alkyl groups.

As used herein, the terms blending or mixing include methods of combining ruber, asphalt and AS through simple agitation with a propeller or any other mixing apparatus as well as aggressive agitation with high shear and also may include the mixing of asphalt rubber and AS by passing the combination through a colloid or other mill. Such other methods of blending and mixing are known to those skilled in the art. The use of shear and or milling can be used to impart heat to the mixture as well as shorten the time for reaction between the asphalt and rubber through the use of AS.

Although exemplary embodiments of the invention and specific examples have been described, various changes, modifications and substitutions may be made by those having ordinary skill in the art without necessarily departing from the spirit and scope of this invention. Specifically, elements or attributes described in connection with one embodiment or example may also be used in connection with any another embodiment or example provided that the inclusion or use of such element or attribute would not render the embodiment or example in which it is incorporated unuseable or otherwise undesirable for an intended application. Accordingly, all such changes, modifications and substitutions to the above-described embodiments and examples are to be included within the scope of the following claims.

What is claimed is:

1. A method for preparing a rubber modified asphalt, said method comprising the steps of:
   a. combining i) asphalt, ii) recycled vulcanized particulate rubber and iii) at least one dodecyl or tridecylbenzene sulfonic acid; and
   b. heating and/or mixing the components combined in Step A to form a rubber modified asphalt.

2. A method according to claim 1 wherein the dodecyl or tridecylbenzene sulfonic acid is linear.

3. A method according to claim 1 wherein the dodecyl or tridecylbenzene sulfonic acid is branched.

4. A method according to claim 1 wherein Step B comprises heating the components to about 300° F.

5. A method according to claim 1 wherein the components are heated to a temperature in the range of about 225° F. to about 450° F. during Step B.

6. A method according to claim 5 wherein the temperature during Step B is about 350° F.

7. A method according to claim 1 wherein the at least one dodecyl or tridecylbenzene sulfonic acid comprises dodecylbenzene sulfonic acid.

8. A method according to claim 1 wherein Step A comprises initially combining asphalt at least one dodecyl or tridecylbenzene sulfonic acid with heat and/or mixing and then subsequently adding recycled vulcanized particulate rubber to the mixture.

9. A method according to claim 1 wherein the recycled vulcanized particulate rubber will pass through a #9 U.S. series sieve.

10. A composition comprised of an asphalt, recycled vulcanized particulate rubber and at least one dodecyl or tridecylbenzene sulfonic acid.

11. A composition according to claim 10 where, based on weight, the asphalt is from about 65 to about 98 percent, the recycled vulcanized particulate rubber is from about 1 to about 25 percent, and the at least one dodecyl or tridecylbenzene sulfonic acid is from about 1 to about 10 percent.

12. A composition according to claim 10 where the recycled vulcanized particulate rubber is at least minus 4 mesh.

13. A composition according to claim 10 where the at least one dodecyl or tridecylbenzene sulfonic acid is linear or branched.

14. A composition according to claim 10 where the at least one dodecyl or tridecylbenzene sulfonic acid is dodecylbenzene sulfonic acid.

15. A composition according to claim 10 further comprising aggregate or an aggregate containing composition.

16. A method for making rubber modified asphalt cement comprising combining at least one of (1) asphalt and recycled vulcanized particulate rubber or (2) a blended mixture of asphalt and recycled vulcanized particulate rubber, with at least one dodecyl or tridecylbenzene sulfonic acid and heated to a temperature of about 225° F. to about 450° F. for a time sufficient to cause at least one of (1) an increase in hardness (2) an increase in softening point, or (3) an improvement in recovery from deformation, in the resulting admixture of rubber modified asphalt cement.

17. A method according to claim 16 wherein the at least one dodecyl or tridecylbenzene sulfonic acid is linear or branched.

18. A method according to claim 16 wherein the at least one dodecyl or tridecylbenzene sulfonic acid is dodecylbenzene sulfonic acid.

19. A method according to claim 16 wherein the unblended recycled vulcanized particulate rubber has a mass of about minus 4 or less.

20. A method according to claim 16 wherein the mixture of asphalt, recycled vulcanized particulate rubber and at least one at least one dodecyl or tridecylbenzene sulfonic acid is heated to a temperature in the range of from about 225° F. to about 450° F.

21. A method according to claim 16 wherein the mixture of asphalt, recycled vulcanized particulate rubber and at least one at least one dodecyl or tridecylbenzene sulfonic acid is heated to about 350° F.

22. A method according to claim 16 wherein the mixture of asphalt, recycled vulcanized particulate rubber and at least one at least one dodecyl or tridecylbenzene sulfonic acid is heated for about 1–2 hours.

23. A method according to claim 16 wherein the mixture of asphalt, recycled vulcanized particulate rubber and at least one at least one dodecyl or tridecylbenzene sulfonic acid is stirred while being heated.

* * * * *